United States Patent
Sudo

(10) Patent No.: US 8,824,093 B1
(45) Date of Patent: Sep. 2, 2014

(54) HEAD POSITION DETECTING METHOD AND MAGNETIC DISK DEVICE

(71) Applicant: Kabushiki Kaisha Toshiba, Tokyo (JP)

(72) Inventor: Daisuke Sudo, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/023,071

(22) Filed: Sep. 10, 2013

Related U.S. Application Data

(60) Provisional application No. 61/840,629, filed on Jun. 28, 2013.

(51) Int. Cl.
*G11B 5/596* (2006.01)

(52) U.S. Cl.
USPC ............. 360/77.08; 360/77.02; 360/29

(58) Field of Classification Search
None
See application file for complete search history.

(56) References Cited

U.S. PATENT DOCUMENTS

| | | | |
|---|---|---|---|
| 6,307,704 B1 | 10/2001 | Seo et al. | |
| 6,839,197 B2 | 1/2005 | Chliwnyj et al. | |
| 7,209,314 B2 | 4/2007 | Bandic et al. | |
| 2006/0221491 A1 | 10/2006 | Kouhara et al. | |
| 2011/0249354 A1 | 10/2011 | Kosugi et al. | |
| 2012/0293885 A1* | 11/2012 | Kosugi et al. | 360/51 |
| 2012/0314321 A1* | 12/2012 | Oyabu et al. | 360/75 |
| 2014/0078614 A1 | 3/2014 | Sudo | |

FOREIGN PATENT DOCUMENTS

| | | |
|---|---|---|
| JP | 2006-277875 | 10/2006 |
| JP | 2011-222092 | 11/2011 |
| JP | 2012-243367 | 12/2012 |
| JP | 2014-059932 A | 4/2014 |

* cited by examiner

*Primary Examiner* — Andrew L Sniezek
(74) *Attorney, Agent, or Firm* — Knobbe, Martens, Olson & Bear, LLP

(57) ABSTRACT

According to one embodiment, a head position detecting method and a magnetic disk device includes measuring a burst output by reading a burst pattern, which is recorded on a magnetic disk, with a magnetic head and calculating a demodulation position of the magnetic head on the basis of the result of the correction of the phase shift of the burst output corresponding to magnetization transition curvature of the burst pattern.

20 Claims, 9 Drawing Sheets

US 8,824,093 B1

HEAD POSITION DETECTING METHOD AND MAGNETIC DISK DEVICE

CROSS-REFERENCE TO RELATED APPLICATIONS

This application is based upon and claims the benefit of priority from Provisional Patent Application No. 61/840,629, filed on Jun. 28, 2013; the entire contents of which are incorporated herein by reference.

FIELD

Embodiments described herein relate generally to a head position detecting method and a magnetic disk device.

BACKGROUND

In a magnetic disk device, sector cylinder numbers of servo data and burst data representing the information about a position on a track are read and a magnetic head is positioned on the basis of the information.

DETAILED DESCRIPTION

According to an embodiment, a burst output is measured by reading a burst pattern, which is recorded on a magnetic disk, with a magnetic head; the phase shift of the burst output corresponding to a magnetization transition curvature of the burst pattern is corrected by deforming complex Lissajous of a fundamental wave component extracted from the burst output so that the linear symmetry of the complex Lissajous is improved; and a demodulation position of the magnetic head is calculated on the basis of the result of the correction of the phase shift of the burst output.

Exemplary embodiments of a head position detecting method and a magnetic disk device will be explained below in detail with reference to the accompanying drawings. Meanwhile, the present invention is not limited by these embodiments.

First Embodiment

Figure 1:
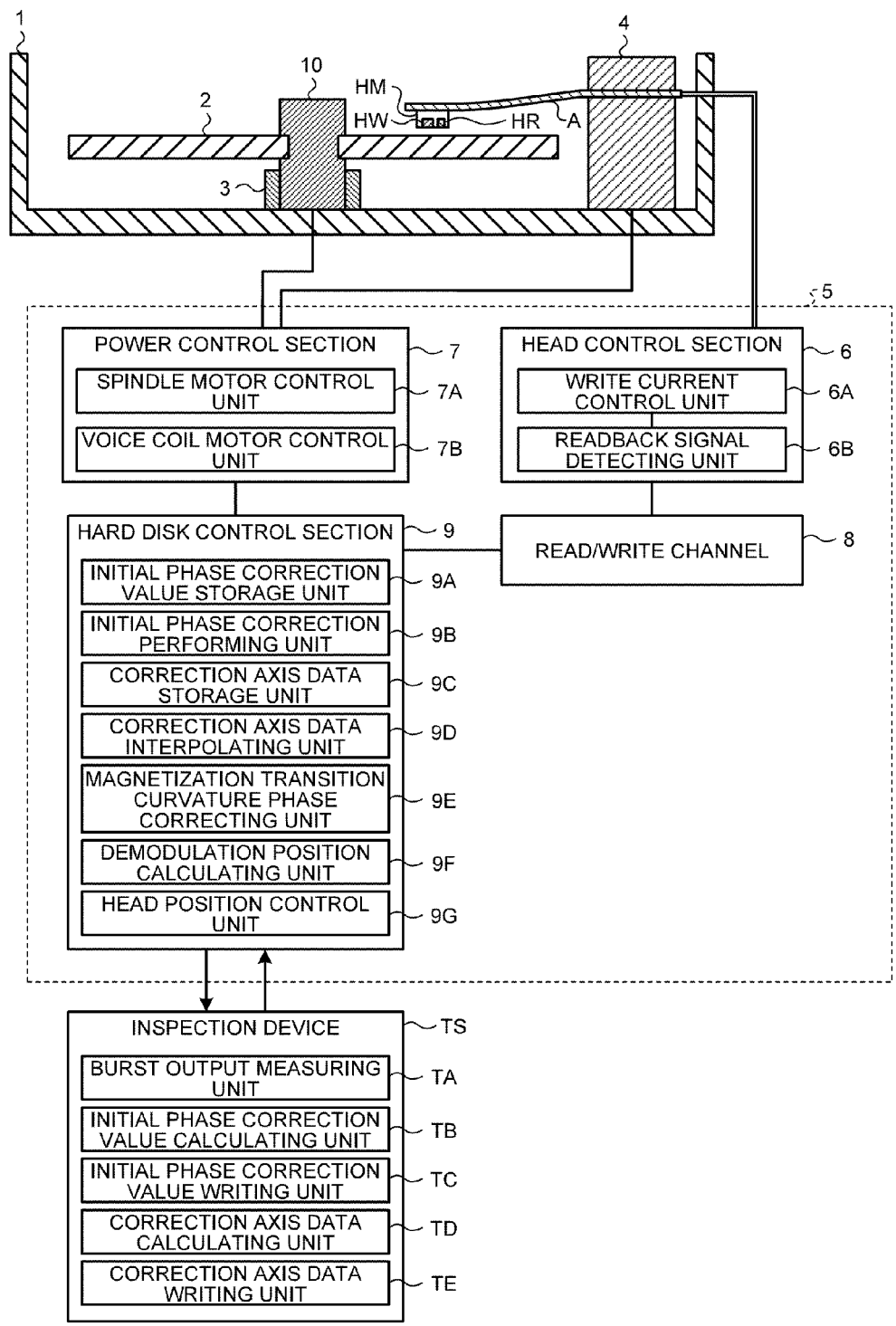
FIG. 1 is a block diagram illustrating a schematic configuration of a magnetic disk device according to a first embodiment.
Figure 2A:
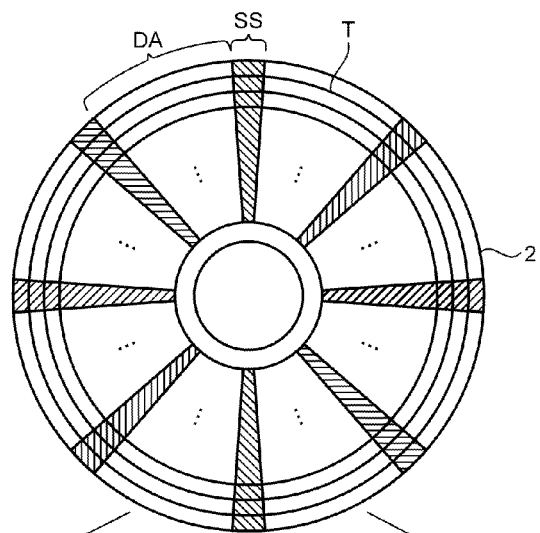
FIG. 2A is a plan view illustrating a track arrangement of a magnetic disk of FIG. 1.
Figure 2B:
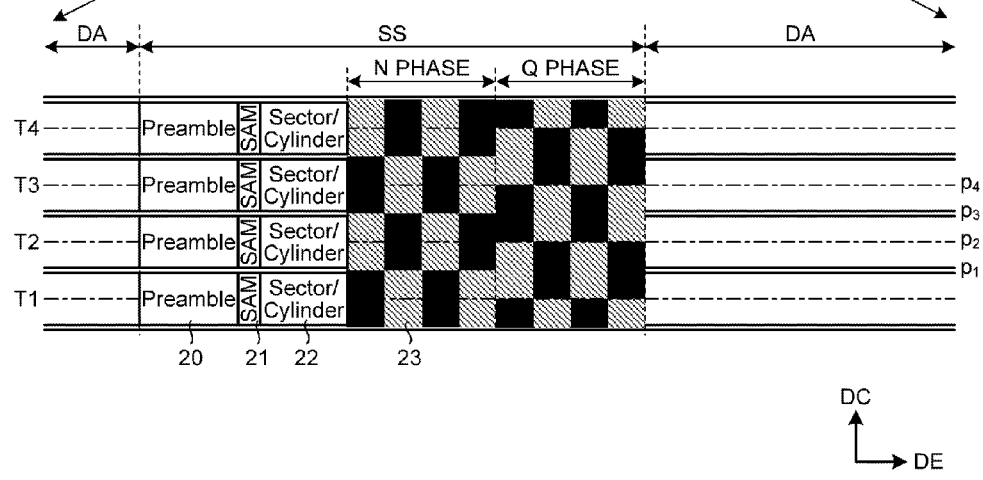
FIG. 2B is a diagram illustrating a configuration example of a servo area of FIG. 2A.

FIG. 1 is a block diagram illustrating a schematic configuration of a magnetic disk device according to a first embodiment, FIG. 2A is a plan view illustrating a track arrangement of a magnetic disk of FIG. 1, and FIG. 2B is a diagram illustrating a configuration example of a servo area of FIG. 2A.

In FIG. 1, the magnetic disk device includes a magnetic disk 2 and the magnetic disk 2 is supported by a spindle 10. Further, the magnetic disk device includes a magnetic head HM, and the magnetic head HM includes a write head HW and a read head HR. Further, the write head HW and the read head HR are disposed so as to face the magnetic disk 2. Here, the magnetic head HM is held above the magnetic disk 2 by an arm A. The arm A can make the magnetic head HM slide in a horizontal plane.

Here, as illustrated in FIGS. 2A and 2B, tracks T are formed on the magnetic disk 2 in a down-track direction DE. Each of the tracks T includes data areas DA in which user data are written and servo areas SS in which servo data are written. Here, the servo areas SS are radially disposed and the data area DA is disposed between the servo areas SS. As illustrated in FIG. 2B, preambles 20, servo area marks 21, sector/cylinder information 22, and burst patterns 23 are written in the servo areas SS. Meanwhile, since the sector/cylinder information 22 can assign servo addresses in the circumferential direction and the radial direction of the magnetic disk 2, the sector/cylinder information 22 can be used in a seek control that moves the magnetic head HM to a target track. The burst pattern 23 can be used in a tracking control that positions the magnetic head HM in a target range of a target track. Further, these servo data may be recorded on the magnetic disk 2 by self-servo write, and may be recorded on the magnetic disk 2 by a dedicated servo writer.

Here, a null type burst pattern formed of an N phase and a Q phase can be used as the burst pattern 23. The N phase and the Q phase can dispose magnetization patterns so that polarities are alternately inverted at an interval of 180° (=1 cyl) in a cross-track direction DC. In addition, the N phase and the Q phase are disposed so that phases are shifted to each other by 90° (0.5 cyl) in the cross-track direction DC. For example, the N phase can be disposed so that polarities are inverted at the boundaries of tracks T1 to T4 adjacent to each other, and the Q phase can be disposed so that polarities are inverted in the middle of each of the tracks T1 to T4.

Returning to FIG. 1, the magnetic disk device includes a voice coil motor 4 that drives the arm A, and includes a spindle motor 3 that rotates the magnetic disk 2 through the spindle 10. Further, the magnetic disk 2, the magnetic head HM, the arm A, the voice coil motor 4, the spindle motor 3, and the spindle 10 are received in a case 1.

Furthermore, the magnetic disk device includes a magnetic recording controller 5, and the magnetic recording controller 5 includes a head control section 6, a power control section 7, a read/write channel 8, and a hard disk control section 9. Here, the magnetic recording controller 5 can measure a burst output on the basis of the burst pattern 23 that is read by the read head HR, and can calculate the demodulation position of the magnetic head HM on the basis of the result of the correction of the phase shift of the burst output that corresponds to the magnetization transition curvature of the burst pattern 23. Meanwhile, the magnetization transition curvature of the burst pattern 23 is caused by the curvature of the distribution of a magnetic field of the magnetic head HM. The magnetization transition curvature of the burst pattern 23 causes the phase shift of the burst output that is measured from the burst pattern 23 read by the read head HR. Moreover, a DFT coefficient of a burst output fundamental wave (a coefficient of a discrete Fourier transform) can be calculated as the burst output.

Further, the head control section 6 includes a write current control unit 6A and a readback signal detecting unit 6B. The power control section 7 includes a spindle motor control unit 7A and a voice coil motor control unit 7B. The hard disk control section 9 includes an initial phase correction value storage unit 9A, an initial phase correction performing unit 9B, a correction axis data storage unit 9C, a correction axis data interpolating unit 9D, a magnetization transition curvature phase correcting unit 9E, a demodulation position calculating unit 9F, and a head position control unit 9G.

The head control section 6 can amplify or detect a signal at the time of recording and reading. The write current control unit 6A can control write current that flows in the write head HW. The readback signal detecting unit 6B can detect a signal that is read by the read head HR.

The power control section 7 can drive the voice coil motor 4 and the spindle motor 3. The spindle motor control unit 7A can control the rotation of the spindle motor 3. The voice coil motor control unit 7B can control the drive of the voice coil motor 4.

The read/write channel 8 can transfer data between the head control section 6 and the hard disk control section 9. Meanwhile, examples of the data may include read data, write data, and servo data. For example, the read/write channel 8 can convert a signal, which is read by the read head HR, into a data format that is handled by a host HS or convert data, which are output from the host HS, into a signal format that is to be written by the write head HW. Examples of this format conversion may include DA conversion or encoding. Further, the read/write channel 8 can perform the decoding of a signal that is regenerated by the read head HR or perform the code modulation of data that are output from the host HS.

The hard disk control section 9 can perform writing/reading control on the basis of an instruction from the outside or transfer data between the outside and the read/write channel 8. The initial phase correction value storage unit 9A stores an initial phase correction angle that is calculated so that the inclination of a tangent near the origin of the complex Lissajous of the fundamental wave component extracted from the burst output becomes zero. The initial phase correction performing unit 9B performs initial phase correction so that the inclination of a tangent near the origin of the complex Lissajous of the fundamental wave component extracted from the burst output becomes zero. The correction axis data storage unit 9C stores correction axis data that are rotated so that an imaginary part of a point present on the complex Lissajous becomes zero. The correction axis data interpolating unit 9D performs linear interpolation for each of sections that are divided at measurement points of complex Lissajous. The magnetization transition curvature phase correcting unit 9E corrects a burst output so that the major axis of the complex Lissajous of the fundamental wave component extracted from the burst output approaches a real axis. The demodulation position calculating unit 9F calculates the demodulation position of the magnetic head HM on the basis of the result of the correction of the phase shift of the burst output. The head position control unit 9G controls the position of the magnetic head HM on the basis of the result of the correction of the demodulation position of the magnetic head HM. Meanwhile, the complex Lissajous is obtained by plotting a real part and an imaginary part of the fundamental wave component of a burst output that is obtained when the read head HR moves in the down-track direction DE, at each cross-track position in each phase.

Furthermore, the magnetic recording controller 5 is connected to an inspection device TS in a detecting step before the shipment of the magnetic disk device. The inspection device TS includes a burst output measuring unit TA, an initial phase correction value calculating unit TB, an initial phase correction value writing unit TC, a correction axis data calculating unit TD, and a correction axis data writing unit TE. The burst output measuring unit TA measures a burst output that is obtained from the burst pattern 23 read by the magnetic head HM. The initial phase correction value calculating unit TB calculates an initial phase correction angle by which the complex Lissajous is rotated so that the inclination of a tangent near the origin of the complex Lissajous of the fundamental wave component extracted from the burst output becomes zero. The initial phase correction value writing unit TC writes an initial phase correction value, which is calculated by the initial phase correction value calculating unit TB, in the initial phase correction value storage unit 9A. The correction axis data calculating unit TD calculates the correction axis data that are rotated so that an imaginary part of a point present on the complex Lissajous becomes zero. The correction axis data writing unit TE writes the correction axis data, which are calculated by the correction axis data calculating unit TD, in the correction axis data storage unit 9C.

While the magnetic disk 2 is rotated by the spindle motor 3, a signal is read from the magnetic disk 2 through the read head HR and is detected by the readback signal detecting unit 6B. The signal, which is detected by the readback signal detecting unit 6B, is converted into data by the read/write channel 8, and is then sent to the hard disk control section 9. In this data conversion, a fundamental wave component of a burst output, which is measured on the basis of the burst pattern 23 read by the read head HR, is extracted and the complex Lissajous of the fundamental wave component can be obtained. Further, in the hard disk control section 9, the demodulation position of the magnetic head HM is calculated on the basis of the signal of the burst pattern 23 detected by the readback signal detecting unit 6B and the tracking control is performed on the basis of the demodulation position so that the magnetic head HM traces on a track T.

At this time, burst pattern 23 are sent to the inspection device TS through the hard disk control section 9. Furthermore, in the burst output measuring unit TA, a burst output is measured on the basis of the burst pattern 23 and is sent to the initial phase correction value calculating unit TB and the correction axis data calculating unit TD. Moreover, in the initial phase correction value calculating unit TB, an initial phase correction value is calculated on the basis of the burst output that is measured by the burst output measuring unit TA and is written in the initial phase correction value storage unit 9A through the initial phase correction value writing unit TC. Further, in the correction axis data calculating unit TD, the correction axis data are calculated on the basis of the burst output that is measured by the burst output measuring unit TA and are written in the correction axis data storage unit 9C through the correction axis data writing unit TE.

Figure 3A:
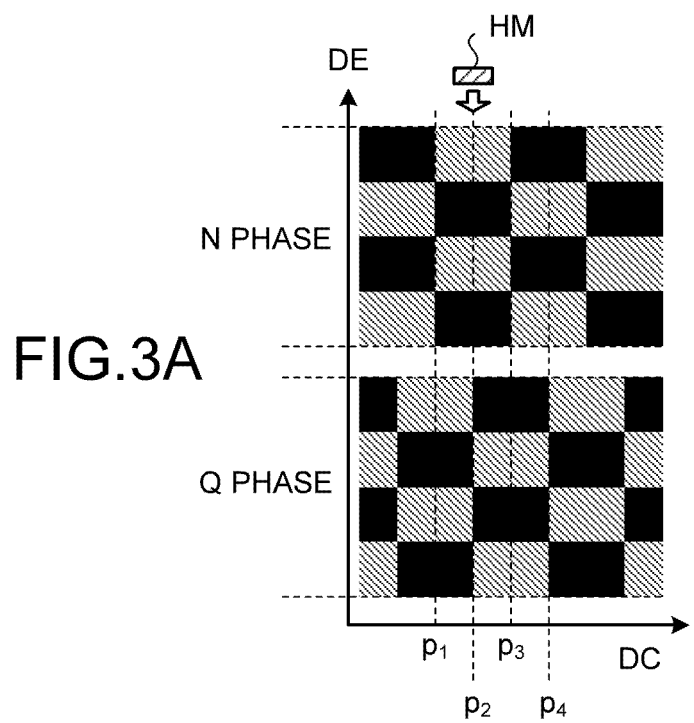
FIG. 3A is a diagram illustrating an example of a null type burst pattern when magnetization transition curvature does not occur.
Figure 3B:
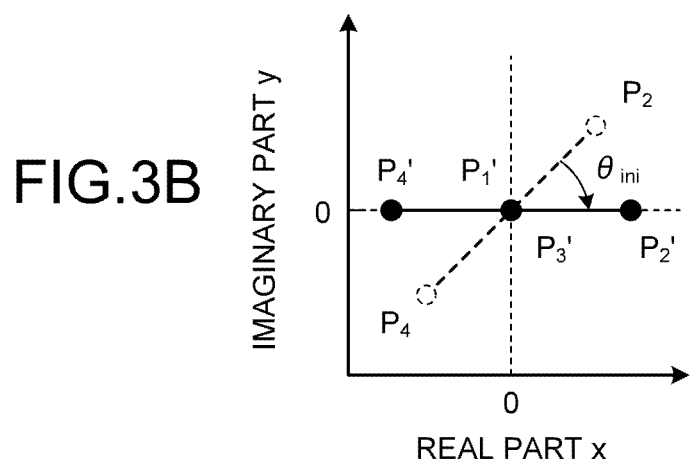
FIG. 3B is a diagram illustrating an example of Lissajous of a null type burst pattern when magnetization transition curvature does not occur.

FIG. 3A is a diagram illustrating an example of a null type burst pattern when magnetization transition curvature does not occur, and FIG. 3B a diagram illustrating an example of Lissajous of a null type burst pattern when magnetization transition curvature does not occur.

Cross-track positions $p_1$ to $p_4$ of FIG. 3A correspond to FIG. 2. The cross-track positions $p_2$ and $p_4$ correspond to middle portions of the tracks T3 and T2, respectively, and the cross-track positions $p_2$ and $p_4$ are different from each other in that phases in the down-track direction are shifted to each other by 180°. Meanwhile, the cross-track position $p_1$ and $p_3$ are boundary portions between the tracks T1 and T2 and between the tracks T2 and T3, respectively.

When the magnetic head HM is positioned at the middle portions $p_2$ and $p_4$ of the tracks in the N phase of the null type burst pattern in FIG. 3A, a burst output of which phases are shifted to each other by 180° and which have a large amplitude are obtained at the respective positions. Further, when the magnetic head HM is positioned at the boundary portion $p_1$ and $p_3$ of the tracks in the N phase of the null type burst pattern, a burst output which has a small amplitude is obtained at each of the positions. For this reason, the complex Lissajous has a linear shape as illustrated in FIG. 3B.

Here, the major axis of the complex Lissajous does not correspond to the real axis in the burst output at the middle portions $p_2$ and $p_4$ before the correction of the initial phase. For this reason, an initial phase correction angle $\theta_{ini}$ of the complex Lissajous is obtained so that the major axis of the complex Lissajous corresponds to the real axis, and the complex Lissajous is rotated with respect to each measured value by the initial phase correction angle $\theta_{ini}$ so that the major axis is converted to overlap the real axis. As a result, the measured values $P_2$ and $P_4$ of the complex Lissajous at the middle portions $p_2$ and $p_4$ are converted into initial phase correction values $P_2'$ and $P_4'$, respectively. When magnetization transition curvature does not occur, it is possible to convert the major axis of the complex Lissajous so that the major axis of the complex Lissajous overlaps the real axis by performing only this initial phase correction. Accordingly, it is possible to improve accuracy in detecting the position of the magnetic head HM.

Figure 4A:
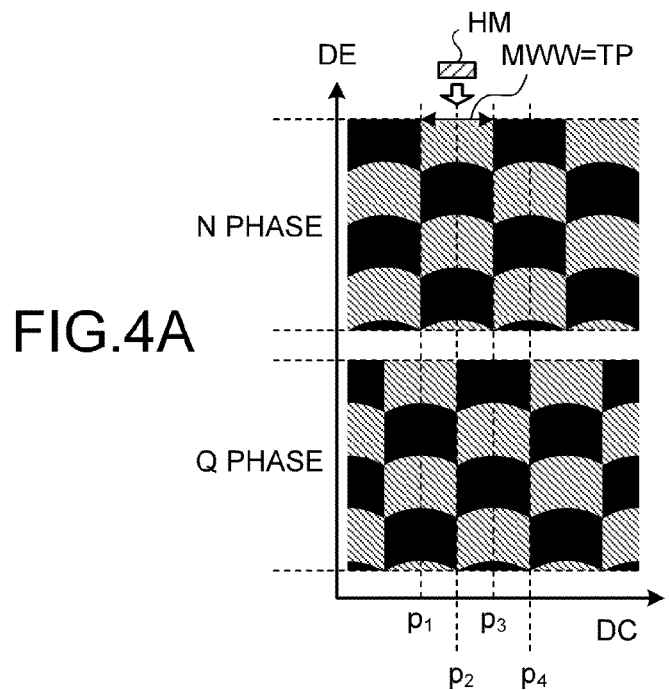
FIG. 4A is a diagram illustrating an example of a null type burst pattern when magnetization transition curvature occurs in a case in which a magnetic write width MWW is equal to a track pitch.
Figure 4B:
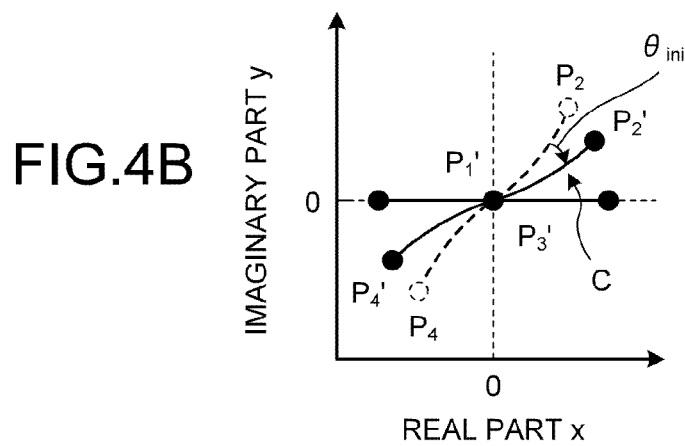
FIG. 4B is a diagram illustrating an example of complex Lissajous of the null type burst pattern of FIG. 4A.
Figure 4C:
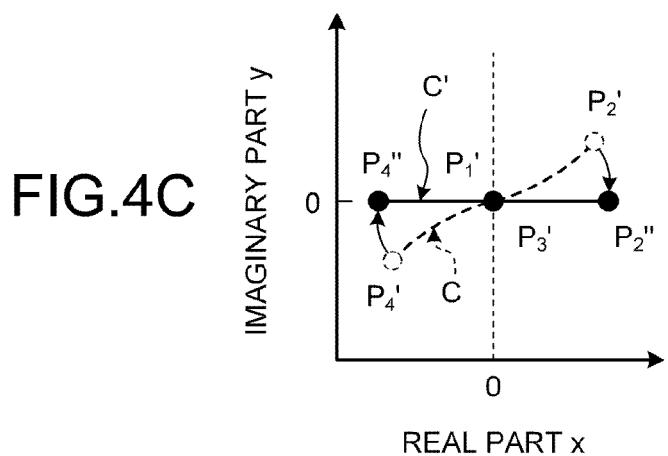
FIG. 4C is a diagram illustrating a method of correcting the complex Lissajous of the null type burst pattern of FIG. 4A.

FIG. 4A is a diagram illustrating an example of a null type burst pattern when magnetization transition curvature occurs in a case in which a magnetic write width MWW is equal to a track pitch, FIG. 4B is a diagram illustrating an example of complex Lissajous of the null type burst pattern of FIG. 4A, and FIG. 4C is a diagram illustrating a method of correcting the complex Lissajous of the null type burst pattern of FIG. 4A.

Here, a magnetic write width MWW is a width of a pattern, which is formed when the magnetic head HM writes a pattern of a single track, in the cross-track direction DC. When a burst pattern is to be written, the magnetic head HM is moved in the cross-track direction DC by a predetermined interval and writes a pattern in the down-track direction DE at each of the cross-track positions, so that a burst pattern is formed. The interval by which the magnetic head is moved in the cross-track direction DC at this time is a track pitch Tp.

When magnetization transition curvature occurs in a case in which the magnetic write width MWW is equal to the track pitch Tp in FIG. 4A, the phases of the burst output at the respective cross-track positions ($p_1$, $p_2$, $p_3$, and $p_4$) are shifted to each other. For this reason, the complex Lissajous has a non-linear shape as illustrated by a dotted line of FIG. 4B.

In the initial phase correction of the non-linear complex Lissajous, a tangent of the complex Lissajous is obtained using a measurement point near the origin of the complex Lissajous. Further, the complex Lissajous is rotated with respect to each measured value by the initial phase correction angle $\theta_{ini}$ so that this tangent is parallel to the real axis. As a result, the measured values $P_2$ and $P_4$ of the complex Lissajous at the middle portions $p_2$ and $p_4$ are converted into the initial phase correction values $P_2'$ and $P_4'$, respectively. The initial phase correction value calculating unit TB of FIG. 1 obtains the initial phase correction angle $\theta_{ini}$, and writes the initial phase correction angle $\theta_{ini}$ in the initial phase correction value storage unit 9A through the initial phase correction value writing unit TC.

When the complex Lissajous has a non-linear shape, the major axis of the complex Lissajous cannot be converted so as to correspond to the real axis in the initial phase correction. For this reason, in order to make the major axis of the complex Lissajous correspond to the real axis, the complex Lissajous is rotated as illustrated in FIG. 4C while a rotation angle of each measurement point of the complex Lissajous is changed according to the curvature of the complex Lissajous. In this case, correction axis data C used to rotate the complex Lissajous are obtained as illustrated in FIG. 4C. When the correction axis data C ($C_{x1}$, $C_{y1}$) are rotated so that the major axis of the complex Lissajous corresponds to the real axis, phase correction data C' are obtained and the initial phase correction values $P_2'$ and $P_4'$ of the complex Lissajous at the middle portions $p_2$ and $p_4$ are converted into magnetization transition curvature phase correction values $P_2''$ and $P_4''$, respectively. The correction axis data calculating unit TD of FIG. 1 obtains the correction axis data C, and writes the correction axis data C in the correction axis data storage unit 9C through the correction axis data writing unit TE. Meanwhile, when the magnetic write width MWW is equal to the track pitch Tp, the initial phase correction values $P_2'$ and $P_4'$ themselves of the complex Lissajous become the correction axis data C ($C_{x1}$, $C_{y1}$).

Figure 5A:
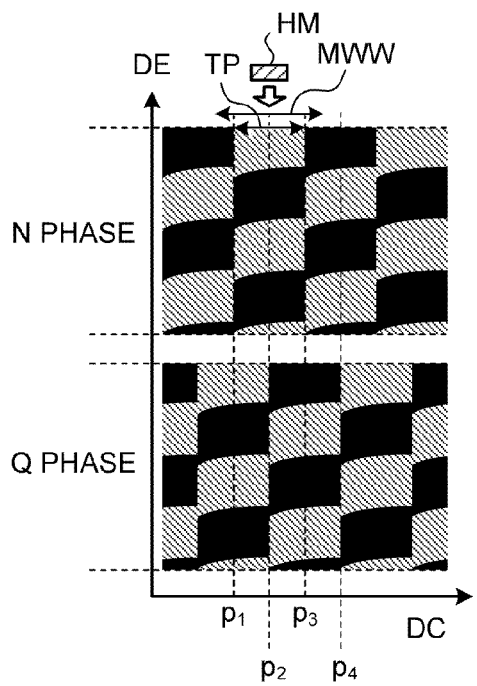
FIG. 5A is a diagram illustrating an example of a null type burst pattern when magnetization transition curvature occurs in a case in which a magnetic write width MWW is larger than a track pitch.
Figure 5B:
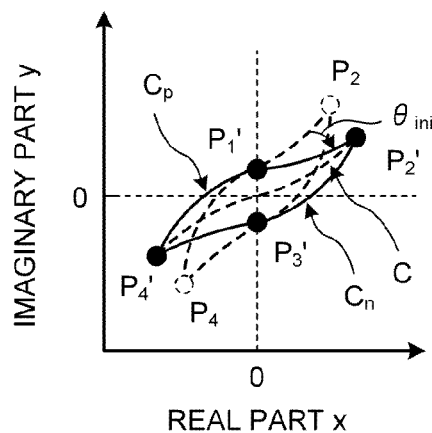
FIG. 5B is a diagram illustrating an example of complex Lissajous of the null type burst pattern of FIG. 5A.
Figure 5C:
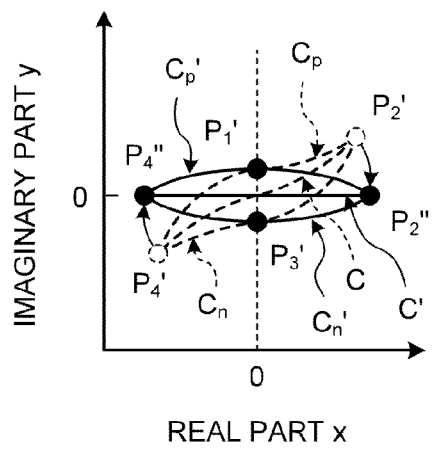
FIG. 5C is a diagram illustrating a method of correcting the complex Lissajous of the null type burst pattern of FIG. 5A.

FIG. 5A is a diagram illustrating an example of a null type burst pattern when magnetization transition curvature occurs in a case in which a magnetic write width MWW is larger than a track pitch, FIG. 5B is a diagram illustrating an example of complex Lissajous of the null type burst pattern of FIG. 5A, and FIG. 5C is a diagram illustrating a method of correcting the complex Lissajous of the null type burst pattern of FIG. 5A.

When magnetization transition curvature occurs in a case in which the magnetic write width MWW is larger than the track pitch Tp in FIG. 5A, connection portions between adjacent patterns are formed in the radial direction at end portions $p_1$ and $p_3$ of the N phase of the null type burst pattern. Accordingly, the phases of the burst output at the middle portions $p_2$ and $p_4$ of the N phase of the null type burst pattern are shifted to each other by 90°. For this reason, the complex Lissajous has a hysteresis shape as illustrated in FIG. 5B.

In the initial phase correction of the complex Lissajous with a hysteresis shape, a tangent of the complex Lissajous is obtained using a measurement point near the origin of the complex Lissajous. Further, the complex Lissajous is rotated with respect to each measured value by the initial phase correction angle $\theta_{ini}$ so that this tangent is parallel to the real axis. As a result, the measured values $P_2$ and $P_4$ of the complex Lissajous at the middle portions $p_2$ and $p_4$ are converted into the initial phase correction values $P_2'$ and $P_4'$, respectively. The initial phase correction value calculating unit TB of FIG. 1 obtains the initial phase correction angle $\theta_{ini}$, and writes the initial phase correction angle $\theta_{ini}$ in the initial phase correction value storage unit 9A through the initial phase correction value writing unit TC.

When the complex Lissajous has a hysteresis shape, the major axis of the complex Lissajous cannot be converted so as to correspond to the real axis in the initial phase correction. For this reason, in order to make the major axis of the complex Lissajous correspond to the real axis, the complex Lissajous is rotated as illustrated in FIG. 5C while a rotation angle of each measurement point of the complex Lissajous is changed according to the curvature of the complex Lissajous. In this case, correction axis data C ($C_{x1}$, $C_{y1}$) used to rotate the complex Lissajous are obtained as illustrated in FIG. 5C. When the magnetic write width MWW is larger than the track pitch Tp, the initial phase correction values $P_2'$ and $P_4'$ of the complex Lissajous do not correspond to the correction axis data C.

Accordingly, the correction axis data C ($C_{x1}$, $C_{y1}$) are calculated by, for example, the following method. The positive side ($P_4'$~$P_1'$~$P_2'$) of the imaginary part of the complex Lissajous is denoted by $C_p$ and the negative side ($P_4'$~$P_3'$~$P_2'$) of the imaginary part of the complex Lissajous is denoted by $C_n$. It is possible to obtain the correction axis data C ($C_{x1}$, $C_{y1}$) by calculating a minor axis component average value at each major axis value between the complex Lissajous $C_p$ and $C_n$. Major axis components $C_{x1}$ of the correction axis data C may have a regular interval or an irregular interval. Meanwhile, when the linear interpolation of the correction axis data C is performed, it is possible to reduce a magnetization transition curvature phase correction error by reducing division in an x section in which an absolute value $|d^2y/dx^2|$ differentiated with respect to a true correction axis is large.

When the correction axis data C are rotated so that the major axis of the complex Lissajous corresponds to the real axis, phase correction data C' are obtained. Further, when measurement points of the complex Lissajous $C_p$ and $C_n$ are rotated according to the rotation angles of the correction axis data C ($C_{x1}$, $C_{y1}$) at this time, phase correction data $C_p'$ and $C_n'$ are obtained and the initial phase correction values $P_2'$ and $P_4'$ of the complex Lissajous at the middle portions $p_2$ and $p_4$ are converted into magnetization transition curvature phase correction values $P_2''$ and $P_4''$, respectively. Meanwhile, when the measurement points of the complex Lissajous $C_p$ and $C_n$ are rotated, point present on the correction axis data C ($C_{x1}$, $C_{y1}$) may be referred, the real part of the point being the same as the measurement point. Or when the measurement points of the complex Lissajous $C_p$ and $C_n$ are rotated, point present on the correction axis data C ($C_{x1}$, $C_{y1}$) may be referred, the point being closest to the measurement points. The correction axis data calculating unit TD of FIG. 1 obtains the correction axis data C ($C_{x1}$, $C_{y1}$) and writes the correction axis data C ($C_{x1}$, $C_{y1}$) in the correction axis data storage unit 9C through the correction axis data writing unit TE.

Figure 6:
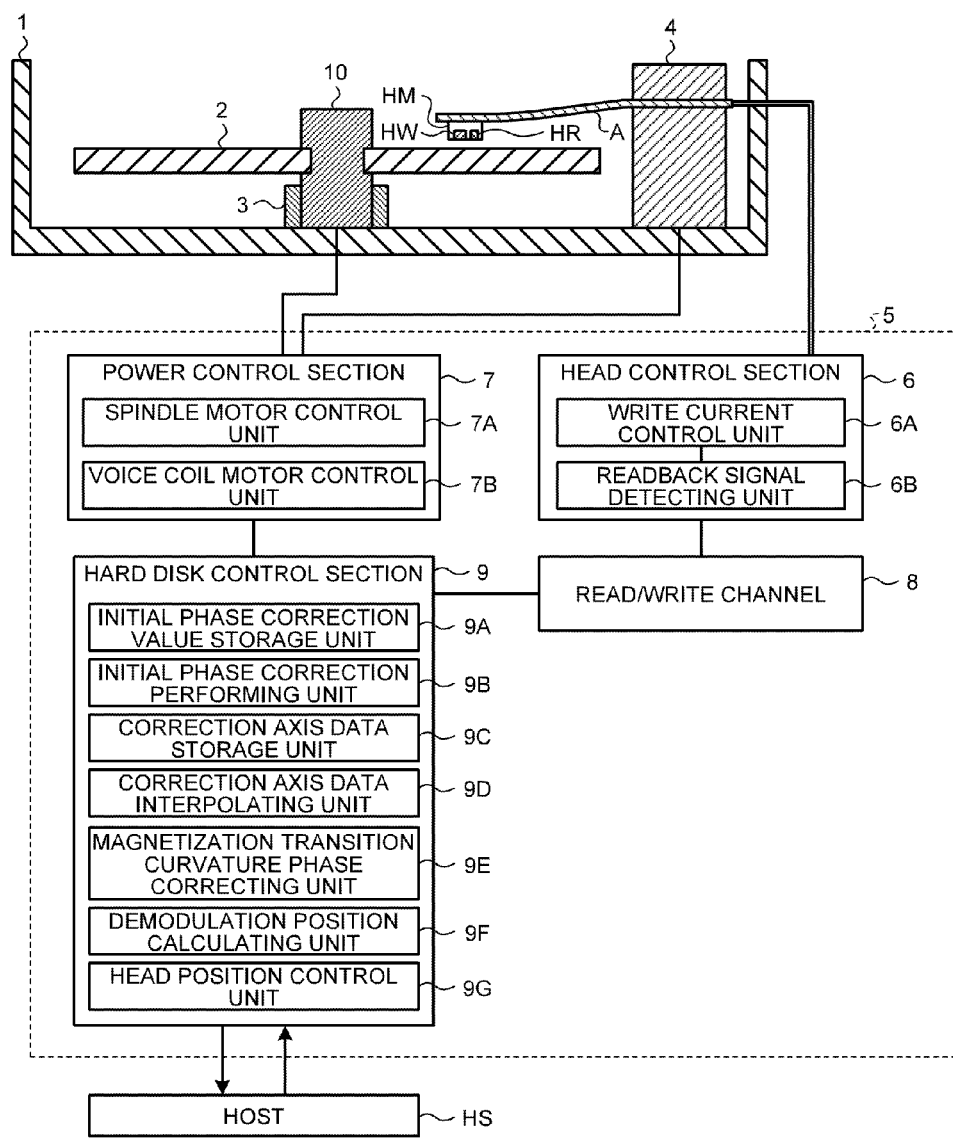
FIG. 6 is a block diagram illustrating a schematic configuration at the time of the read and write of data areas of the magnetic disk included in the magnetic disk device of FIG. 1.

FIG. 6 is a block diagram illustrating a schematic configuration at the time of the read and write of data areas of the magnetic disk that is included in the magnetic disk device of FIG. 1.

In FIG. 6, the initial phase correction angle $\theta_{ini}$ is written in the initial phase correction value storage unit 9A and the correction axis data C are written in the correction axis data storage unit 9C in a detecting step before the shipment of a product. After that, the product is shipped.

Further, when a product is used after being shipped, the magnetic recording controller 5 is connected to the host HS. Meanwhile, a personal computer, which issues a write command or a read command to the magnetic disk device, or an external interface may be used as the host HS.

Further, while the magnetic disk 2 is rotated by the spindle motor 3, a signal is read from the magnetic disk 2 through the read head HR and is detected by the readback signal detecting unit 6B. After the signal, which is detected by the readback signal detecting unit 6B, is converted into data by the read/write channel 8, the data are sent to the hard disk control section 9. Furthermore, in the hard disk control section 9, the demodulation position of the magnetic head HM is calculated on the basis of the burst pattern 23 that is detected by the readback signal detecting unit 6B. At this time, in the initial phase correction performing unit 9B, the initial phase correction angle $\theta_{ini}$ is read from the initial phase correction value storage unit 9A and the complex Lissajous is rotated with respect to each measured value by the initial phase correction angle $\theta_{ini}$, so that initial phase correction is performed.

Furthermore, in the correction axis data interpolating unit 9D, the correction axis data C are read from the correction axis data storage unit 9C and are subjected to linear interpolation for each of the sections that are divided at the measurement points of complex Lissajous. Moreover, since a value, which is obtained when the correction axis data C having been subjected linear interpolation are rotated for each of the sections so as to approach the real axis, is referred in the magnetization transition curvature phase correcting unit 9E, the burst output is corrected so that the major axis of the complex Lissajous approaches the real axis. Further, in the demodulation position calculating unit 9F, the demodulation position of the magnetic head HM is calculated on the basis of the result of the correction of the phase shift of the burst output. Furthermore, tracking control is performed in the head position control unit 9G on the basis of the result of the calculation of the demodulation position of the magnetic head HM so that the magnetic head HM traces on the track T.

Figure 7A:
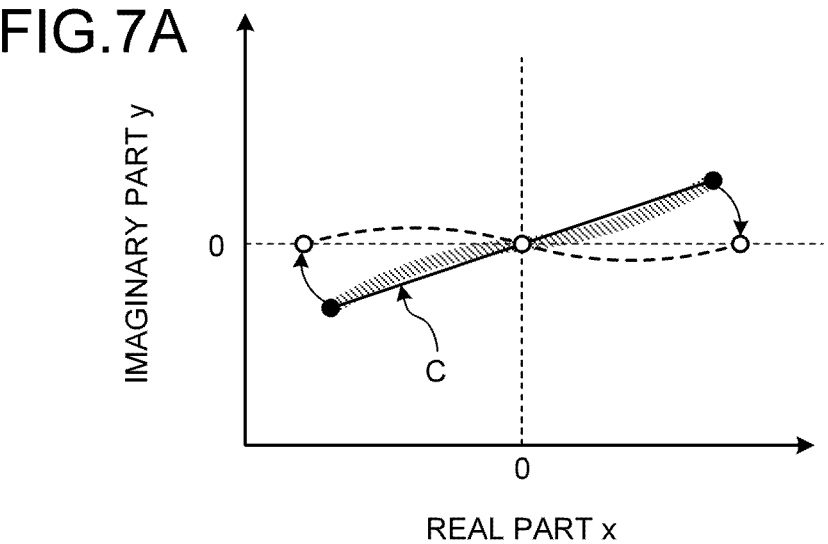
FIG. 7A is a diagram illustrating an example of a method of interpolating correction axis data in the magnetization transition curvature phase correction of FIG. 4C.
Figure 7B:
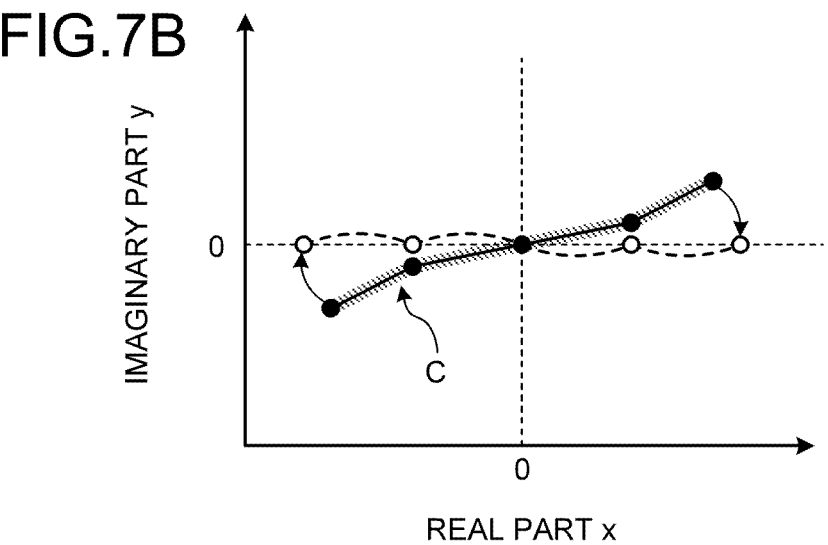
FIG. 7B is a diagram illustrating another example of a method of interpolating correction axis data in the magnetization transition curvature phase correction of FIG. 4C.

FIG. 7A is a diagram illustrating an example of a method of interpolating correction axis data in the magnetization transition curvature phase correction of FIG. 4C, and FIG. 7B is a diagram illustrating another example of a method of interpolating correction axis data in the magnetization transition curvature phase correction of FIG. 4C.

Since an error from a true value is generated when measurement points are rough in FIG. 7A, linear interpolation is performed. For example, when the number of measurement points is three, correction axis data C ($C_{x2}$, $C_{y2}$) are calculated by the linear interpolation of two sections that are divided at the measurement points. Further, the correction axis data C ($C_{x2}$, $C_{y2}$) are rotated so that the imaginary part of each section becomes zero. As a result, a burst output is corrected.

Furthermore, for example, when the number of measurement points is five in FIG. 7B, correction axis data C ($C_{x2}$, $C_{y2}$) are calculated by the linear interpolation of four sections that are divided at the measurement points. Moreover, the correction axis data C ($C_{x2}$, $C_{y2}$) are rotated so that the imaginary part of each section becomes zero. As a result, a burst output is corrected.

Figure 8A:
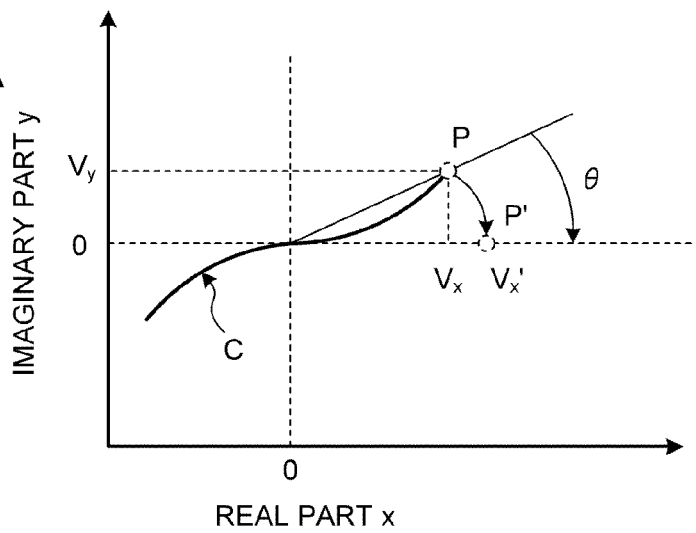
FIG. 8A is a diagram illustrating a method of correcting a magnetization transition curvature phase of the null type burst pattern of FIG. 4A.
Figure 8B:
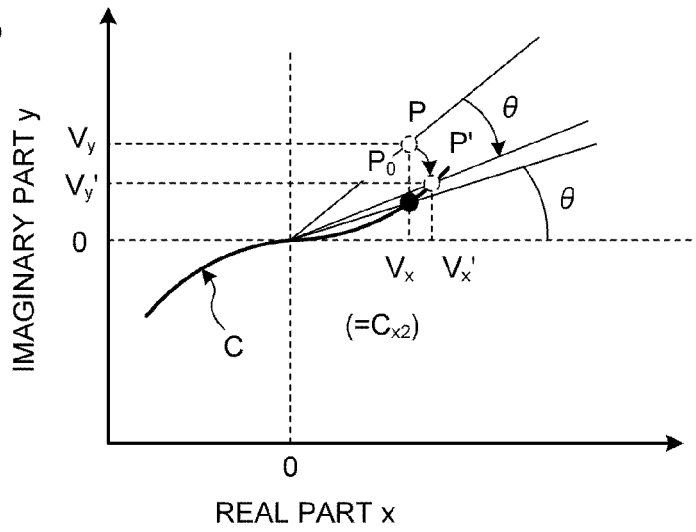
FIG. 8B is a diagram illustrating an example of a method of correcting a magnetization transition curvature phase of the null type burst pattern of FIG. 5A.
Figure 8C:
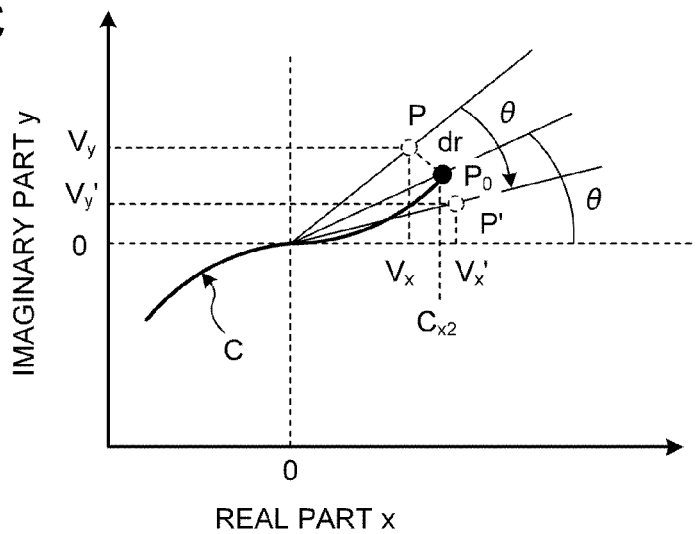
FIG. 8C is a diagram illustrating another example of a method of correcting a magnetization transition curvature phase of the null type burst pattern of FIG. 5A.

FIG. 8A is a diagram illustrating a method of correcting a magnetization transition curvature phase of the null type burst pattern of FIG. 4A, FIG. 8B is a diagram illustrating an example of a method of correcting a magnetization transition curvature phase of the null type burst pattern of FIG. 5A, and FIG. 8C is a diagram illustrating another example of a method of correcting a magnetization transition curvature phase of the null type burst pattern of FIG. 5A.

In FIG. 8A, measured values obtained at the measurement point ($V_x$, $V_y$) of the position P correspond to a correction axis in the null type burst pattern of FIG. 4A. Accordingly, the measured values correspond to the correction axis data C ($C_{x2}$, $C_{y2}$) subjected to linear interpolation. Further, the measured values are corrected so that the major axis of the correction axis data C corresponds to the real axis. At this time, when the position P present on the correction axis data C is rotated by a correction angle θ so that the major axis of the correction axis data C corresponds to the real axis, the position P is moved to a position P'. When the real part of the position P' is $V_x'$ at this time, the real part $V_x$ of the measurement point is corrected to $V_x'$ after the imaginary part $V_y$ of the measurement point is corrected to zero.

In FIG. 8B, measured values obtained at the measurement point ($V_x$, $V_y$) of the position P do not correspond to a correction axis in the null type burst pattern of FIG. 5A. For example, first, a rotation correcting angle θ, which is an angle with respect to the real axis, is obtained with reference to a correction axis point $P_0$ present on the correction axis data C ($C_{x2}$, $C_{y2}$) in which the major axis component of the correction axis corresponds to $V_x$. Further, when a real part is denoted by $V_x'$ and an imaginary part is denoted by $V_y'$ when the position P is rotated by the rotation correcting angle θ and the position P is moved to the position P', a real part $V_x$ and an imaginary part $V_y$ of the measurement point at the position P are corrected to a real part $V_x'$ and an imaginary part $V_y'$ at the position P'.

In FIG. 8C, the correction axis data C ($C_{x2}$, $C_{y2}$) closest to the measurement point ($V_x$, $V_y$) of the position P may be referred in the null type burst pattern of FIG. 5A. Specifically, first, a rotation correcting angle θ, which is an angle with respect to the real axis, is obtained with reference to a correction axis point $P_0$ present on the correction axis data C ($C_{x2}$, $C_{y2}$) in which a distance dr between a correction axis data stream and the position P becomes minimum. Further, when a real part is denoted by $V_x'$ and an imaginary part is denoted by $V_y'$ when the position P is rotated by the rotation correcting angle θ and the position P is moved to the position P', a real part $V_x$ and an imaginary part $V_y$ of the measurement point at the position P are corrected to a real part $V_x'$ and an imaginary part $V_y'$ at the position P'.

Next, in FIG. 6, the magnetization transition curvature phase correcting unit 9E obtains a magnetization transition curvature phase correction value ($V_x'$, $V_y'$) by multiplying the measurement point ($V_x$, $V_y$) by a rotation matrix that uses an angle θ formed between the correction axis data C ($C_{x2}$, $C_{y2}$) of the measurement point and the major axis as a parameter. This rotation matrix may be given as the following formula (1).

$$\begin{bmatrix} V_x' \\ V_y' \end{bmatrix} = \begin{bmatrix} \cos\theta & -\sin\theta \\ \sin\theta & \cos\theta \end{bmatrix} \begin{bmatrix} V_x \\ V_y \end{bmatrix} \quad (1)$$

Magnetization transition curvature phase correction components ($V_{Nx}'$ $V_{Qx}'$) in the N phase and the Q phase are obtained by the above-mentioned method, and a demodulation position pos is calculated (γ correction operation). The demodulation position pos may be given as the following formula (2) when '$X=|V_{Qx}'/V_{Nx}'|$' is satisfied.

$$pos=(1-G_m)X+G_m X^2$$

$$X=|V_{Qx}'/V_{Nx}'| \quad (2)$$

However, $G_m$ is a coefficient that is used for the correction for improving linearity.

Meanwhile, as disclosed in JP 2012-243367 A, a calculation formula for a demodulation position pos may be changed according to an area that is determined by the values of magnetization transition curvature phase correction components ($V_{Nx}'$, $V_{Qx}'$).

Figure 9:
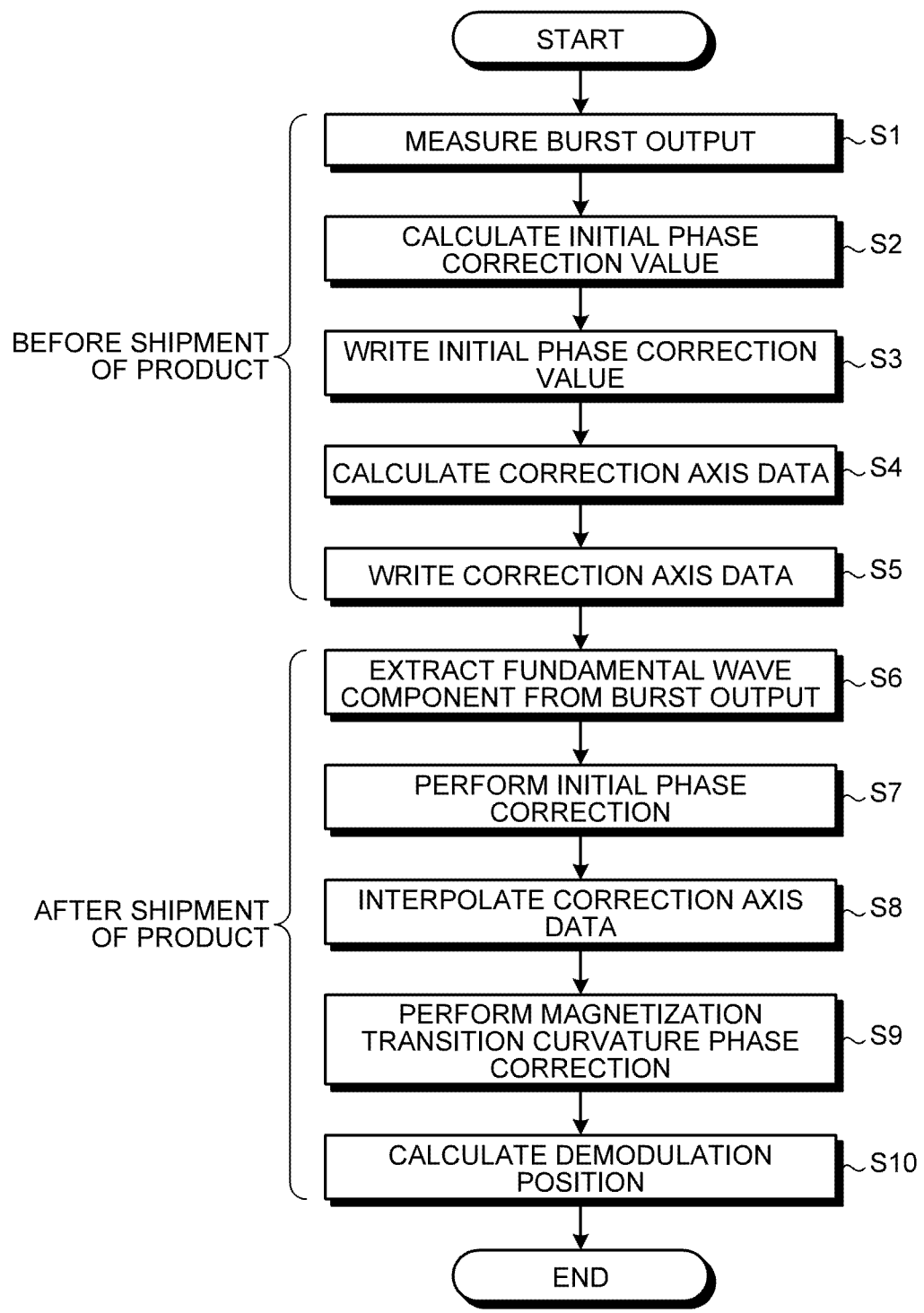
FIG. 9 is a flowchart illustrating the operation of the magnetic disk device of FIG. 1.

FIG. 9 is a flowchart illustrating the operation of the magnetic disk device of FIG. 1.

In FIG. 9, the inspection device TS measures a burst output of the magnetic disk device while the magnetic disk device is connected to the inspection device TS (S1). Next, the inspection device TS calculates an initial phase correction value of the complex Lissajous obtained from the burst output (S2), and writes the initial phase correction value in the magnetic disk device (S3). After that, the inspection device TS calculates the correction axis data of the complex Lissajous obtained from the burst output (S4), and writes the correction axis data in the magnetic disk device (S5).

Then, the magnetic disk device extracts a fundamental wave component from the burst output while the magnetic disk device is connected to the host HS (S6). Further, the magnetic disk device performs initial phase correction on the complex Lissajous of the fundamental wave component, which is extracted from the burst output, on the basis of the initial phase correction value that is written from the inspection device TS (S7). Next, the magnetic disk device interpolates the correction axis data that are written from the inspection device TS (S8), and performs the correction of the phase shift of the burst output by performing magnetization transition curvature phase correction on the interpolated correction axis data (S9). After that, the magnetic disk device calculates the demodulation position of the magnetic head HM on the basis of the result of the correction of the phase shift of the burst output (S10). Meanwhile, the steps S1 to S5 can be performed before the shipment of a product, and the steps S6 to S10 can be performed after the shipment of a product.

According to this embodiment, since the phase shift of the burst output corresponding to the magnetization transition curvature of the burst pattern is corrected, the accuracy in detecting the position of the magnetic head can be improved even when the curvature of the distribution of a magnetic field of the magnetic head occurs.

Second Embodiment

A method, which makes the major axis of the complex Lissajous of a fundamental wave component extracted from a burst output correspond to a real axis and uses the data of the real axis in the γ correction operation in order to correct the phase shift of the burst output corresponding to the magnetization transition curvature of the burst pattern, has been described in the above-mentioned first embodiment. However, the major axis of the complex Lissajous of a fundamental wave component extracted from a burst output may correspond to an imaginary axis and the data of the imaginary axis may be used in the γ correction operation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without depart-

What is claimed is:

1. A head position detecting method comprising:
measuring a burst output by reading a burst pattern, which is recorded on a magnetic disk, with a magnetic head;
correcting a phase shift of the burst output corresponding to magnetization transition curvature of the burst pattern, by deforming complex Lissajous of a fundamental wave component extracted from the burst output so that the linear symmetry of the complex Lissajous is improved; and
calculating a demodulation position of the magnetic head on the basis of the result of the correction of the phase shift of the burst output.

2. The head position detecting method of claim 1, wherein the burst output is corrected so that a major axis of the complex Lissajous of the fundamental wave component extracted from the burst output approaches a real axis or an imaginary axis.

3. The head position detecting method of claim 2, wherein the burst output is corrected by rotating measurement points present on the complex Lissajous according to the curvature of the complex Lissajous so that the major axis of the complex Lissajous corresponds to the real axis or the imaginary axis.

4. The head position detecting method of claim 2, wherein linear interpolation is performed for each of sections divided at the measurement points present on the complex Lissajous, and the burst output is corrected by rotating the result of the linear interpolation of each section so that the result corresponds to the real axis or the imaginary axis.

5. The head position detecting method of claim 1, wherein when the complex Lissajous of the fundamental wave component extracted from the burst output has hysteresis, the burst output is corrected on the basis of the reference result of a value when the major axis of a composite curve formed by the combination of positive and negative sides of an imaginary part of the complex Lissajous or positive and negative sides of a real part of the complex Lissajous approaches a real axis or an imaginary axis, respectively.

6. The head position detecting method of claim 5, wherein the composite curve is formed by averaging values of the positive side of the imaginary part of the complex Lissajous and values of the negative side of the imaginary part or averaging values of the positive side of the real part and values of the negative side of the real part, respectively.

7. The head position detecting method of claim 5, wherein when the composite curve is rotated so that the major axis corresponds to the real axis or the imaginary axis, the measurement point present on the complex Lissajous are corrected on the basis of reference result of a point present on the composite curve, the real part or the imaginary part of the point being the same as the measurement point present on the complex Lissajous, respectively.

8. The head position detecting method of claim 5, wherein when the composite curve is rotated so that the major axis corresponds to the real axis or the imaginary axis, the measurement point present on the complex Lissajous are corrected on the basis of reference result of points present on the composite curve that are closest to the measurement points present on the complex Lissajous.

9. The head position detecting method of claim 1, wherein initial phase correction is performed so that the inclination of a tangent near the origin of the complex Lissajous of the fundamental wave component extracted from the burst output becomes zero.

10. The head position detecting method of claim 1, wherein the burst pattern is a null type burst pattern that is formed of an N phase and a Q phase.

11. A magnetic disk device comprising:
a magnetic head;
a magnetic disk on which a burst pattern used to determine position of the magnetic head on a track on the basis of the result of the reading by the magnetic head is recorded; and
a magnetic recording controller that measures a burst output by reading the burst pattern, which is recorded on the magnetic disk, with the magnetic head, corrects a phase shift of the burst output corresponding to magnetization transition curvature of the burst pattern, by deforming complex Lissajous of a fundamental wave component extracted from the burst output so that the linear symmetry of the complex Lissajous is improved, and calculates a demodulation position of the magnetic head on the basis of the result of the correction of the phase shift of the burst output.

12. The magnetic disk device of claim 11,
wherein the magnetic recording controller includes a phase correcting unit that corrects the burst output so that a major axis of the complex Lissajous of the fundamental wave component extracted from the burst output approaches a real axis or an imaginary axis,
a demodulation position calculating unit that calculates the demodulation position of the magnetic head on the basis of the result of the correction of the phase shift of the burst output, and
a head position control unit that controls the position of the magnetic head on the basis of the result of the calculation of the demodulation position.

13. The magnetic disk device of claim 12, wherein the phase correcting unit corrects the burst output by rotating measurement points present on the complex Lissajous according to the curvature of the complex Lissajous so that the major axis of the complex Lissajous corresponds to the real axis or the imaginary axis.

14. The magnetic disk device of claim 12, wherein the magnetic recording controller performs linear interpolation for each of sections divided at the measurement points present on the complex Lissajous, and corrects the burst output by rotating the result of the linear interpolation of each section so that the result corresponds to the real axis or the imaginary axis.

15. The magnetic disk device of claim 11, wherein when the complex Lissajous of the fundamental wave component extracted from the burst output has hysteresis, the magnetic recording controller corrects the burst output on the basis of the reference result of a value when the major axis of a composite curve formed by the combination of positive and negative sides of an imaginary part of the complex Lissajous or positive and negative sides of a real part of the complex Lissajous approaches a real axis or an imaginary axis, respectively.

16. The magnetic disk device of claim 15, wherein the magnetic recording controller forms the composite curve by averaging values of the positive side of the imaginary part of the complex Lissajous and values of the negative side of the imaginary part or averaging values of the positive side of the real part and values of the negative side of the real part, respectively.

17. The magnetic disk device of claim 15, wherein when the composite curve is rotated so that the major axis corresponds to the real axis or the imaginary axis, the measurement point present on the complex Lissajous are corrected on the basis of reference result of a point present on the composite curve, the real part or the imaginary part of the point being the same as the measurement point present on the complex Lissajous, respectively.

18. The magnetic disk device of claim 15, wherein when the composite curve is rotated so that the major axis corresponds to the real axis or the imaginary axis, the magnetic recording controller corrects the measurement point present on the complex Lissajous on the basis of reference result of points present on the composite curve that are closest to the measurement points present on the complex Lissajous.

19. The magnetic disk device of claim 11, wherein the magnetic recording controller includes an initial phase correction performing unit that performs initial phase correction so that the inclination of a tangent near the origin of the complex Lissajous of the fundamental wave component extracted from the burst output becomes zero.

20. The magnetic disk device of claim 11, wherein the burst pattern is a null type burst pattern that is formed of an N phase and a Q phase.

* * * * *